United States Patent
Sander (10) Patent No.: US 10,836,330 B2
(45) Date of Patent: Nov. 17, 2020

(54) DEVICE, SYSTEM AND METHOD FOR AUTOMATED DETACHING OF AN ADHESIVE ELEMENT FROM A CARRIER ELEMENT

(71) Applicant: SIKA TECHNOLOGY AG, Baar (CH)

(72) Inventor: Wolf-Peter Sander, Nidderau (DE)

(73) Assignee: SIKA TECHNOLOGY AG, Baar (CH)

( * ) Notice: Subject to any disclaimer, the term of this patent is extended or adjusted under 35 U.S.C. 154(b) by 46 days.

(21) Appl. No.: 15/895,195

(22) Filed: Feb. 13, 2018

(65) Prior Publication Data

US 2018/0339666 A1    Nov. 29, 2018

(30) Foreign Application Priority Data

Feb. 17, 2017  (DE) .................. 10 2017 103 288

(51) Int. Cl.
| | |
|---|---|
| *B60R 13/08* | (2006.01) |
| *B25B 11/00* | (2006.01) |
| *B23P 19/04* | (2006.01) |
| *B23K 26/40* | (2014.01) |
| *B62D 27/02* | (2006.01) |
| *B25B 5/12* | (2006.01) |
| *F16B 11/00* | (2006.01) |

(52) U.S. Cl.
CPC ............. *B60R 13/08* (2013.01); *B23K 26/40* (2013.01); *B23P 19/04* (2013.01); *B25B 11/005* (2013.01); *B62D 27/026* (2013.01); *B08B 2220/01* (2013.01); *B25B 5/12* (2013.01); *F16B 11/006* (2013.01)

(58) Field of Classification Search
CPC . C09J 5/00; B60R 13/06; B60R 13/08; B62D 27/026; B62D 27/06; Y10T 156/11; Y10T 156/1132; Y10T 156/19; Y10T 156/1944
USPC ......... 156/238, 60, 230, 249, 719, 750, 758, 156/702, 705, 767
See application file for complete search history.

(56) References Cited

U.S. PATENT DOCUMENTS

| | | | | |
|---|---|---|---|---|
| 6,041,502 | A * | 3/2000 | Stanley ................ | B41J 2/17559 29/458 |
| 7,637,714 | B2 * | 12/2009 | Kabeshita ......... | H01L 21/67132 156/64 |
| 9,484,236 | B2 * | 11/2016 | Okada .................... | H01L 21/683 |
| 2017/0144367 | A1 * | 5/2017 | Mayer ..................... | B29C 65/08 |

FOREIGN PATENT DOCUMENTS

| | | | |
|---|---|---|---|
| DE | 102010027378 A1 | 3/2011 | |
| DE | 102010051786 A1 * | 7/2011 | ............. B60R 13/08 |
| DE | 102010051786 A1 | 7/2011 | |

\* cited by examiner

*Primary Examiner* — Michael N Orlando
*Assistant Examiner* — Abhishek A Patwardhan
(74) *Attorney, Agent, or Firm* — Oliff PLC (57) ABSTRACT

A device for the automated removal of an adhesive element from a support element extending along a main extension plane, including a deposition device to deposit the support element and a fixing device to fix the support element to the deposition device,
wherein the fixing device and/or the deposition device are configured such that the fixed support element, at least in certain areas, especially in an area with one or more adhesive elements, is stretchable spaced apart from the deposition device along the main extension plane.

14 Claims, 4 Drawing Sheets

DEVICE, SYSTEM AND METHOD FOR AUTOMATED DETACHING OF AN ADHESIVE ELEMENT FROM A CARRIER ELEMENT

TECHNICAL FIELD

The present disclosure relates to a device for an automated removal of an adhesive element from a support element, a system having a manipulator and a device for a removal of an adhesive element, as well as a method for the automated removal of an adhesive element from a support element.

From the documents DE 10 2010 051 786 A1 and DE 10 2010 027 378 A1, methods and devices for the automated application of an adhesive element to a vehicle component are known. In particular, this relates to adhesive elements, such as for example in the form of adhesive strips or adhesive pads, provided for sealing and/or closing production-related openings of the vehicle component. For the automated application to the vehicle component, especially a manipulator is incorporated in a production line to transfer the respective adhesive element to its designated location. For reloading the manipulator with new adhesive elements, it is provided for a transfer/deposition device to be transferred to a manipulator. This transfer/deposition device provides a support element, on which adhesive elements are arranged, wherefrom, in turn, the manipulator peels off the adhesive elements.

With this known methods and devices, there is the problem in that the adhesive element becomes partially damaged while being removed from the support element, when the manipulator tries to remove the adhesive element by way of a vacuum suction cup. Due to previously occurring peel off forces, the adhesive element deforms, thereby causing the adhesive surfaces to become partially damaged. The peel off procedure at least sometimes fails, because the vacuum flow becomes interrupted at the suction gripper of the manipulator. This is aggravated by the fact that the support element is being fixed and maintained on the deposition surface by the negative pressure mentioned in DE 10 2010 051 786 A1, thereby also causing the adhesive element to undergo "adherence by suction," which consequently makes it difficult for the adhesive element to be removed. Moreover, there is the risk for the adhesive butyl surface of the adhesive element to become stamped with the surface structure of the deposition surface under the negative pressure between the support element and the deposition surface, thereby risking damage thereof.

In particular, with such adhesive elements, which are manufactured from aluminum in connection with a viscous butyl rubber composition, it has been proven that part of the adhesive element remains adhered to the support element or that the adhesive element cannot be peeled off at all.

The disclosure provides a device by which the prior art problems may be overcome, and automated removal of the adhesive element from the support element, especially by way of a manipulator, may be improved, especially in view of removal of the adhesive element with minimum errors.

According to the disclosure, a device for an automated removal of an adhesive element from a support element extending along a main extension plane is provided, comprising
   a deposition device to deposit the support element and
   a fixing device to fix the support element to the deposition device,
wherein the fixing device and/or the deposition device are formed such that the fixed support element, at least in certain areas, especially in an area comprising one or more adhesive elements, is stretched along the main extension plane and spaced apart from the deposition device.

In relation to prior art, the device according to the disclosure allows for assisting removal of the adhesive element from the support element. The arrangement that is stretched and spaced apart from the deposition device allows for freedom of movement of the support element, especially in the areas comprising the adhesive elements, which proves to be helpful in removing, especially peeling off, the adhesive element from the support element. For example, the support element may locally be deformed or tilted while being accessed by a manipulator in the area of the adhesive element, which is beneficial to peeling off the adhesive element. By peeling off it is especially understood by the person skilled in the art that the adhesive element successively becomes detached in certain areas from the support element until it finally is completely separated from the support element. Preferably, peeling off starts in a segment or arc portion, respectively, of the outer circumference of the adhesive element.

In the area between the support element and the deposition device, shaped elements may also be arranged, and in fact both positive shaped elements, such as for example column elements, abutments or convexities, and negative shaped elements, such as recesses, grooves, openings or bores, each may preferably be arranged in the area of an adhesive element, so that the support element will positively or negatively be curved in this area during action of the manipulator, thereby causing peel off "peel-off," i.e. separation of the adhesive element from the support element, the separation extending from the outside to inside, as viewed from the fringe or the center, respectively.

However, another advantage of the device according to the disclosure resides in that there is no essential need for said positive or negative shape elements. Thus, the adhesive elements may randomly be arranged on the support element and are not required to exactly match these shaped elements that are arranged and oriented on said deposition device.

Due to the random arrangement on the support element, the respective adhesive elements for a component to be adhered to, such as for example an automotive body or another industrial product, may be pre-arranged, i.e. the adhesive elements of different sizes may together be randomly arranged on a support element and may be provided to be picked by the manipulator. Even with industrial products that are to be differently loaded, one and the same arrangement may in this way be flexibly employed, providing different arrangements of adhesive elements.

It is especially preferred that the device is provided integrally with a production line for the production of vehicle components, and the adhesive elements are for example provided to seal production-related openings in the vehicle component. It is furthermore preferred that a manipulator simultaneously removes the adhesive elements individually or collectively from the support element. In doing so, the manipulator moves towards the support element and is oriented in relation to the adhesive elements. By way of a negative pressure in the manipulator, the adhesive element is able to be removed from the support element and to be taken up by the manipulator. For this, the manipulator comprises at least one suction element, for example a suction cup, via which the adhesive element is taken up. It is preferred that the manipulator takes up the adhesive element with a joint stamp, which is pivoted for removal or which, while taking up the adhesive element, is inclined in relation to a direction extending perpendicular to the main extension plane of the stretched support element. It is furthermore preferably provided for the adhesive element to comprise aluminum in combination with a viscous butyl rubber composition. For such adhesive elements, removal from the support element has been proved to be especially advantageous, i.e. a comparably high success rate has been proven to be able to be realized for the removal of the adhesive element from the support element.

Further advantages and characteristics will arise from the following description of preferred embodiments of the disclosure, while reference is made to the accompanying figures. Individual characteristics of the individual embodiment may be combined with each other within the scope of the disclosure.

According to another embodiment of the present disclosure, it is provided for the device to comprise a gas pressure device to create an overpressure or negative pressure in an intermediate area between the deposition device and the support element, especially the stretched support element. In this way, the intermediate area between the deposition device and the support element is able to be advantageously manipulated, such that removal of the adhesive element from the support element may furthermore be promoted in this way.

If a negative pressure is produced, according to one variant of the disclosure, column elements are provided, acting as abutments or counter bearings to the adhesive elements, so that detachment, ranging up to vertical removal of the adhesive elements, will be simplified. For this, the column elements are arranged in a direction extending perpendicular to the main extension plane below the adhesive elements. It is also conceivable that the column element, in a sucker area, will locally be sucked onto the deposition device by the negative pressure, and that therefore the support element will be stretched between the aspiration range and an area, where the column element is fixed in the fringe zone thereof. In this way, it is possible for the support element to be present in an inclined and spaced apart orientation to a surface side of the deposition device. A gas cushion, especially an air cushion, is produced, especially at an overpressure in the intermediate area between the deposition device and the support element, advantageously promoting removal of the adhesive element from the support element. Preferably, a pressure is set between 0.5 and 5 bar, more preferably between 0.8 and 2.5 bar, and most preferably is set to 2 bar. In this way, sufficient tension in the support element is able to advantageously be produced, which tension on the one hand assures spacing the support element apart from the deposition device, and on the other hand, sufficient deformation may be allowed, which assures the support element to be freely moved, if required.

Preferably, the gas is air, which is supplied or removed from the intermediate area between the deposition device and the support element to assist peeling off the adhesive element from the support element. Another advantage of making use of an overpressure is that, according to another variant of the disclosure, no abutments or counter bearings, respectively, i.e. shaped elements, are required for the respective adhesive elements. Thus, the adhesive elements may arbitrarily be distributed on the support element, and there is no need to be adapted to any abutments nor is there any need for the support elements to be oriented in relation to the deposition device, respectively, thereby advantageously enabling automated pre-setting of the adhesive elements at the support element. Moreover, damages or deformations caused by the abutments at the adhesive elements are able to be avoided. The gas pressure device for example is a pump, a vacuum pump or a fan. It is furthermore preferred for the device to comprise a control device, which allows to adjust or to control the pressure within the range between the support element and the deposition device, respectively. It is furthermore preferred for the fixed and/or stretched support element to essentially extend parallel to a side surface and/or an outer surface of the deposition device.

It is suitably provided for the deposition device to comprise a channel or a channel system, wherein the channel or the channel system connects the gas pressure device and the intermediate area between the deposition device and the support element to each other. Incorporation of the channel and/or channel system in the deposition device allows immediate and selective adjustment of the pressure in the intermediate area between the support element and the deposition device. The channel system thereby is of specific advantage in that uniform pressure built-up may be realized. Preferably, the exit openings of the channel or of the channel system are arranged at the side of the deposition device facing the stretched and/or fixed support element. It is preferably provided that the fixing device stretches the support element between two contact areas, along a stretching direction extending parallel to the main extension plane, wherein the channel system or the channel is arranged between the two contact areas in a direction following the stretching direction.

Preferably, the fixing device comprises a stretching or clamping frame or a pulling and/or stretching device. By way of the stretching or clamping frame not only simple closing may be realized, but the stretching or clamping frame furthermore allows the support element to become evenly stretched along all possible stretching directions extending parallel to the main extension plane. Preferably, the stretching frame comprises a stretching frame side sealing member, especially a circumferential sealing member, such as a sealing ring or O-ring. The fixing device is formed such that the support element for fixing is arranged between the sealing member located at the stretching frame side and a sealing member located at the deposition device side and the support element is fixed and/or stretched by a pressing force acting between the stretching frame side sealing member and the deposition device side sealing member. Preferably, the sealing member located at the stretching frame side and the sealing member located at the deposition device side each are arranged within a groove to prevent lateral slipping of the sealing members under pressing condition. For applying tension onto the support element, the sealing member located at the stretching frame side advantageously is larger than the sealing member located at the deposition device side or vice versa, wherein the sealing member located at the stretching frame side and the sealing member located at the deposition device side are arranged offset to each other, such that the support element arranged between the two sealing members becomes bent and/or deformed during pressing the two sealing members towards each other and a shear force is formed acting towards the stretching direction.

Preferably, the sealing member located at the stretching frame side and the sealing member located at the deposition device side are concentrically arranged and an inner diameter of the internally situated sealing member and an inner diameter of the externally situated sealing members differs by 0.2 to 0.9, more preferably between 0.3 and 0.8 and most preferably by 0.5 and 0.8 of the width dimension in the stretching direction of the annular section of the internally situated sealing member. In this way, it may be assured by an offset to allow adjustment to be sufficiently large and/or the desired tension during compression of the sealing member located at the stretching frame side and the sealing member located at the deposition device side. It is furthermore preferred to provide for the stretching or clamping frame to clamp a fringe zone of the support element. The fringe zone of the support element preferably is 5 to 25 mm, preferably 10 to 18 mm and especially preferably is essentially 15 mm.

Furthermore, it is conceivable that the tension is produced by a pulling and/or stretching device. The pulling and/or stretching device is formed such that it causes a force along a direction extending parallel to the main extension plane thereby causing a tension in the support element. For example, the pulling and/or stretching device comprises a winding member, onto which the support element is wound for clamping. It is also conceivable that the support element is stretched by way of linear motors. Moreover, it is also conceivable that the support element is oriented extending parallel across the deposition device and a tension in the support element is produced by displacing the deposition device towards the support element. At that point, the support element in turn is preferably deposited on sealing members located at the deposition device side and is clamped therebetween. In particular, it is provided that, in an intermediate area between the deposition device and the support element, a negative pressure and/or an overpressure is created, when the support element is stretched by way of the pulling and/or stretching device or is stretched by the offset of the deposition device.

Thus, the support element may be stretched spaced apart above the deposition device by way of a fixing device unrolling the support element, for example, from a roll, or is clamped by way of clamps to the outer area, i.e. to the outer fringe zone of the deposition device, and the stretching or clamping frame is displaced from below out of the deposition device towards the support element, so that the sealing members located at the deposition side or even only the tension elements located at the deposition device side displace the support element away from the deposition device and stretching it, since the fringe zones of the support element have already been fixed in advance.

It is also conceivable for the support element to be formed as a sheet or page and to fix the sheet on the deposition device at the fringe (for example with clamping bars). A stretching or clamping frame then telescopes out of the deposition device with a circumferential fringe, thus stretching the support element, which has some elasticity, spaced apart above the deposition device. By way of a negative pressure, pre-tension of the support element may further be increased, in that the negative pressure between the support element and the deposition device counteracts the direction of moving the stretching or clamping frames, thus further increasing the tension of the support element. The variant of the stretching or clamping frames arranged within or below the deposition device has the advantage that the manipulator may smoothly lift the adhesive elements off the support element without any collision with any clamping or stretching frames that are applicable from above. "Above," in this sense, means at the side of the support element, which is accessible to the manipulator, and "below" means the opposite side.

There is no need for the stretching or clamping frame to necessarily be circumferential, it is also possible to solely stretch the support element at two or three locations, so that a distance is created between the deposition device and the support element. Similarly, it is possible to fix the support element on the deposition device by way of a fixing device, especially at the edges of the deposition device, and to realize this fixation in a gas-tight manner, such that a stretching or clamping frame or respective stretching or clamping bars are applied, so that gas-tight connection between the deposition device and the support element is created, at least at the fringe of the deposition device, and overpressure between the support element and the deposition device, for example by way of inflow of gas, will subsequently be produced, so that the support element flexibly lifts off the deposition device, thus becoming spaced apart therefrom.

In another embodiment of the present disclosure, it is provided for the device to comprise an automatable manipulator, especially suction grippers with a joint stamp or a star gripper joint system, for taking up the adhesive elements from the support element.

According to another embodiment of the present disclosure it is provided for the fixing device to comprise a lever mechanism, especially a knee lever mechanism, for pressing the fixing device and thus at least pressing the edges of the support element against the deposition device. In this way, a pressing force can be provided in a simple manner, allowing the support element to be fixed at the deposition device and to be stretched.

It is especially preferred for the device to comprise a sensor device, especially a camera, to acquire the position of the adhesive elements on the support element. By means of the sensor device, most precise acquisition of the actual distribution and position of the adhesive elements on the support element may be realized. This has been proven to be especially advantageous, with the present device, in that deformations or displacements may arise during operation between the adhesive elements, due to interaction with the manipulator and to stretching the support element. Moreover, the sensor device allows to make use of different distributions of adhesive elements on the support element. In this way, the device may advantageously be made use of independently of the arrangement of the adhesive elements on the support element.

In another embodiment of the present disclosure, it is provided for the deposition device and/or the fixing device to have a centering aid to orient the support element on the deposition device. By means of the centering aid, the support element may advantageously be oriented while the support element is being deposited, prior to being fixed by way of the fixing device. In this way, reproducibility, and thus process safety during automated deposition of the support element are advantageously increased. For example, the centering aid is a pin or bolt that protrudes from the deposition device. Via appropriate perforations in the support element, the support element may then be placed on the deposition device in the exact position.

It is suitably provided for the deposition device to comprise a relief valve and/or shaped elements in the intermediate area between the deposition device and the support element. By way of the relief valve it may advantageously be assured that in the intermediate area between the deposition device and the support element no critical pressure is exceeded, at which, for example, the support element would become damaged or freedom of movement thereof for optimized peel-off would become too much limited. The shaped elements preferably represent recesses, such as e.g. grooves or furrows, or column elements. Such recesses preferably are arranged in a direction extending perpendicular to the main extension plane of the support element, below the adhesive elements, preferably below a respective adhesive element. In the case of a column element, it preferably forms a counter bearing, supporting the manipulator in peeling off the adhesive element from the column element. In the case of recesses, i.e. negatively shaped elements, an intermediate area is provided to the support element below the adhesive element, which simplifies release. It is conceivable that release starts in a center of the adhesive element. Preferably, the shaped elements are smaller than the adhesive elements on the support element.

The disclosure provides a system comprising a manipulator and a device according to the disclosure for the removal of an adhesive element from the support element. All characteristics described for the device according to the disclosure for the removal of an adhesive element and the advantages thereof can analogously be applied to the system according to the disclosure and vice versa.

In particular, the manipulator is the device from the document DE 10 2010 051 786 A1, and the contents of which is explicitly referred to in relation to the manipulator and the device for the automated application of an adhesive element onto a vehicle component.

The disclosure further provides a method for the automated removal of an adhesive element from a support element, comprising the following process steps:

fixing and stretching the support element on a deposition device by way of a fixing device to form of a distance between the deposition device and the support element; and removing, especially peeling off, the adhesive element from the support element by way of a manipulator.

All characteristics described for the device according to the present disclosure for the removal of an adhesive element, and the advantages thereof can analogously be applied to the method according to the present disclosure and vice versa. Preferably, the method additionally comprises the process step of: generating an overpressure or negative pressure by way of a gas pressure device in an intermediate area between the deposition device and the support element.

Figure 1:
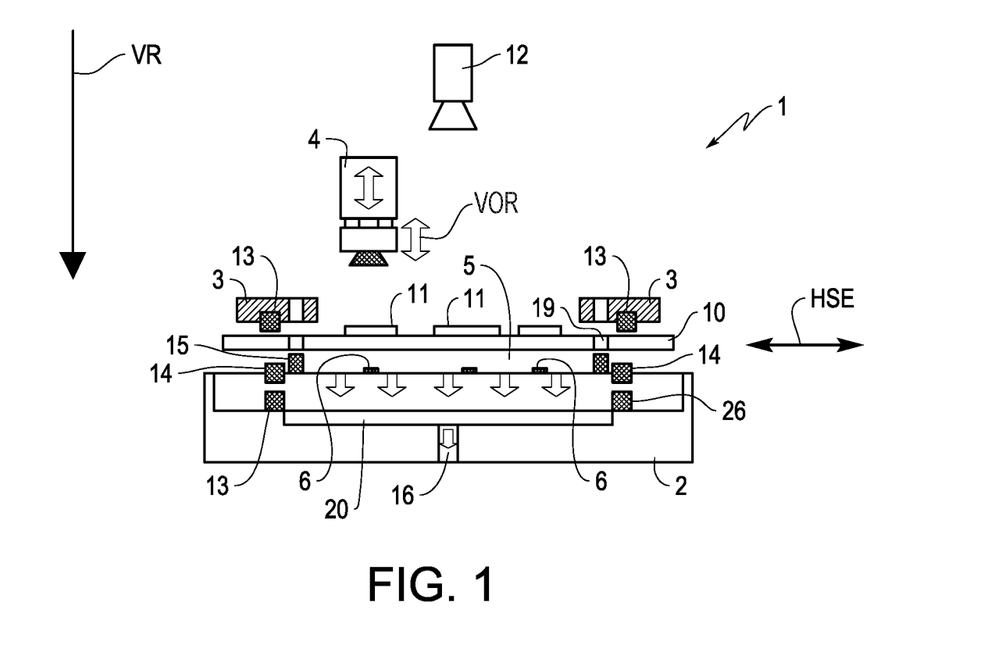
FIG. 1: shows a device for the removal of an adhesive element from a support element.

In FIG. 1 a device 1 for the automated removal of an adhesive element 11 from a support element 10 according to an exemplary embodiment is represented. In particular a device is involved, which is provided for providing adhesive elements 11 in a production line to a manipulator 4, such as e.g. to a robot and/or s star gripper, such that the manipulator 4 may take up the adhesive element 11 for the application thereof onto a work piece or a manufacturing product.

For example, the work piece or the manufacturing product, respectively, is a body part for a vehicle and the adhesive element 11, preferably in the form of a pad or adhesive strip, and is for closing or sealing a production-related opening in the body part, respectively. In particular, the adhesive elements 11 are provided to the manipulator 4 on the support element 10. For example, the adhesive elements 11 are arranged to each other in an equidistant or checkered manner. For the removal of the adhesive element 11, preferably a negative pressure is produced in the manipulator 4, especially in a joint stamp of the manipulator 4.

By means of this negative pressure, the adhesive element 11 is released from the support element 10 and is taken up by the manipulator 4. To facilitate removal from the support element 10 and to thus increase process safety while transferring the adhesive element 11 from the support element 10 to the work piece, it is provided for the device 1 for the removal of the adhesive element 11 from the support element 10 to comprise a deposition device 2 for depositing the support element 10, and a fixing device 3 for fixing the support element 10. To favor removal, especially release, of the adhesive element 11, especially a gas pressure device (not represented) is provided, which, in an area 5 between the deposition device 2 and the support element 10 fixed to the deposition device 2, controls or adjusts a gas pressure, respectively. Furthermore, shaped elements 6 may be provided, providing the support element to bulge during lifting, thus favoring removal and release of the adhesive element, respectively.

In the embodiment represented in FIG. 1, the fixing device 3 is a stretching or clamping frame with a stretching frame side sealing element 13, especially a sealing ring or an O-ring, respectively. For gas-tightly closing the area between the deposition device 2 and the support element 10 the stretching frame is moved along a closing direction VR, until the device 1 enters into a fixing state to fix the support element 10. In the fixing state, the support element 10, especially a fringe zone of the support element, is clamped or pressed between the sealing member located at the stretching frame side 13 and a sealing member located at the deposition device side 14, especially a sealing ring or O-ring, respectively.

Preferably the sealing member located at the deposition device side 14 is arranged and/or configured, such that, in the fixing state, it is offset by distance A in relation to the sealing member located at the stretching frame side 13 in a direction extending perpendicular to the closing direction VR. For example, the distance A has a value, which is smaller than a radius of the sealing member located at the deposition device side 14 or the sealing member located at the stretching frame side 13 provided in the same direction. In this way it may be assured for the sealing element located at the stretching frame side 13 and the sealing member located at the deposition device side 14 to be able to be pressed against each other in the fixing state and the support element 10, for increasing the tension in the support element 10, in its fringe zone, may be bent over one of the sealing elements, i.e. over the sealing member located at the deposition device side 14 or the sealing member located at the stretching frame side 13. For example, the sealing member located at the stretch element side 13 and the sealing member located at the deposition device side 14 are spaced apart from each other in the fixing state in a direction extending perpendicular to the closing direction VR between 0.25 mm and 0.8 mm, preferably between 0.3 mm and 0.6 mm, and especially preferably essentially 0.5 mm. Preferably, for dimensioning the distance A, the distance of the centers of the two sealing members or the respective fringe profiles are relevant. Alternatively, the fixing device 3 is a pulling and/or stretching device, by way of which a force parallel to the main extension plane or a vertical force for stretching the support element is applied.

To position and/or orient the support element 10 on the deposition device 2, a centering aid 15 is preferably provided. For example, the centering aid 15 is formed as pins and/or bolts protruding along the closing direction VR from the deposition device 2, the cross section of which, which is dimensioned perpendicular to the closing direction VR, matches to holes and/or recesses 19 in the support element 10. In other words: the support element 10 comprises one or more recesses 19, which are formed to exactly match the appropriately formed centering aids 15 at the deposition device 2. Via the recesses 19, the support element 10 may be installed on top of the centering elements 15, thereby orienting the support element 10. Then, the shaped elements 6 are also correctly positioned below the adhesive elements 11. Moreover, a sensor device, preferably a camera 12, is provided to acquire the current position of the adhesive elements 11. In this way, it may easily be determined, which adhesive elements 11 have already been removed from the support element 10, and on which position one or more adhesive elements 11 are actually provided to the manipulator 4 on the support element 10.

In the embodiment represented in FIG. 1, it is furthermore provided that a negative pressure is produced in the area 5 between the deposition device 2 and the fixed support element 10, especially while the manipulator 4 peels off the adhesive element 11 from the support element 10. It is conceivable that the negative pressure is established in time just before the support element 10 and/or the adhesive element 11 is accessed by the manipulator 4 and/or is decreased again immediately after having been accessed by the manipulator 4. Alternatively, it is also conceivable for the negative pressure to be maintained essentially constant over a period of time during several times of access by the manipulator 4. To adjust the negative pressure, a channel 16 is provided, which preferably is connected to a gas pressure device, for example a pump, especially a vacuum pump. It is furthermore provided for the deposition device 2 to have a recessed or pot-shaped portion, wherein an insert 17 is inserted, wherein the insert has a plurality of single channels, which, together with the channel 16, form a channel system, to evenly adjust the gas pressure, as viewed via the outer surface of the deposition device and/or the insert. Moreover, the insert 17 and the deposition device 2 are formed such that a chamber 20 is formed in the channel system, i.e. between the channel 16 and the single channels. Moreover, it is provided for the deposition device 2 to be configured such that the support element 10, in the fixed state, is arranged to be without any contact to the deposition device 2, at least in certain areas, or sporadically rests on formed support elements 22.

Figure 2:
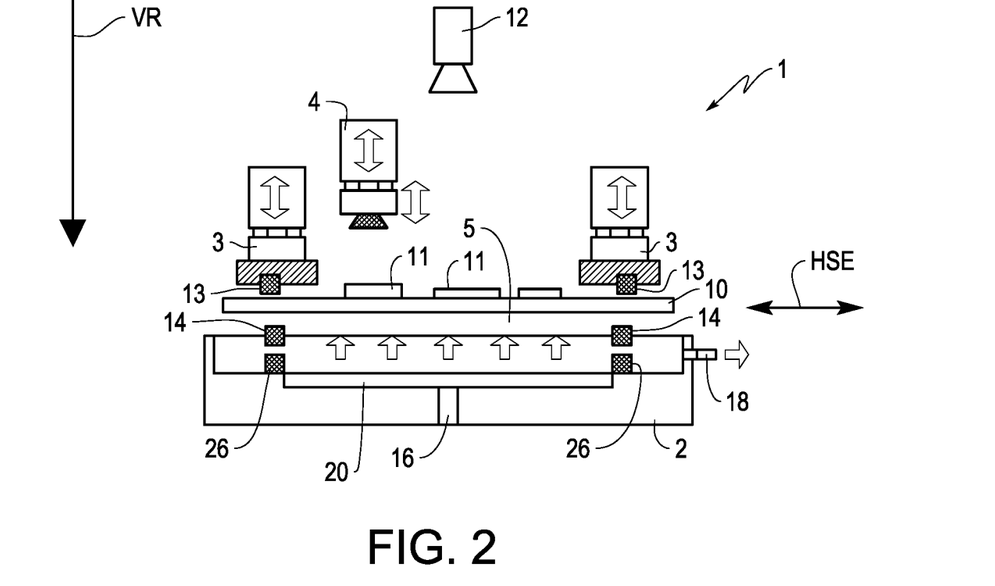
FIG. 2: shows a device for the removal of an adhesive element from a support element according to a first preferred embodiment of the present disclosure.

In FIG. 2, a device 1 for the removal of an adhesive element 11 from a support element 10 is represented according to a first preferred embodiment of the present disclosure. The device 1 essentially differs from the device of FIG. 1 in that herein, an overpressure is applied instead of a negative pressure in the area 5 between the deposition device 2 and the support element 10. For this, gas, especially air, is introduced into the area 5 between the deposition device 2 and the fixed support element 10. In this way, an air cushion advantageously forms below the support element 10, wherein the air cushion supports removal of the adhesive element 11. Accordingly, column elements 22 or shaped elements 6 may advantageously be omitted. In order to avoid rupture or damage of the support element 10, especially while being accessed by the manipulator, a relief valve 18 is provided, through which the gas in the intermediate area between the deposition device 2 and the support element 10 may escape, if the overpressure exceeds a critical area. It is furthermore provided for the stretching frame to be displaceable via an automated lifting device (not represented). In this way, the stretching frame is allowed to be advantageously lowered by way of the lifting device along the closing direction VR, and thus may be transferred into the fixing state in an automated manner.

Figure 3A:
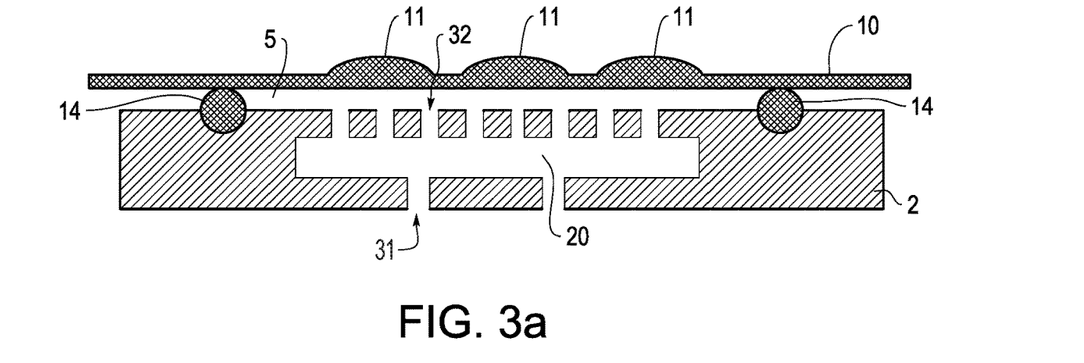
FIG. 3a to 3e: illustrates a method for automated removal of an adhesive element from a support element according to a second preferred embodiment of the present disclosure.
Figure 3B:
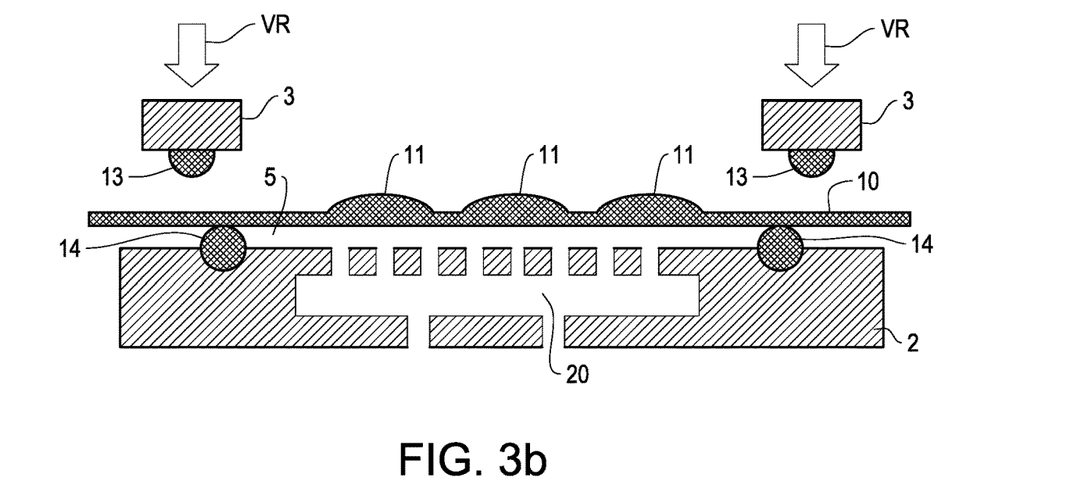
Figure 3C:
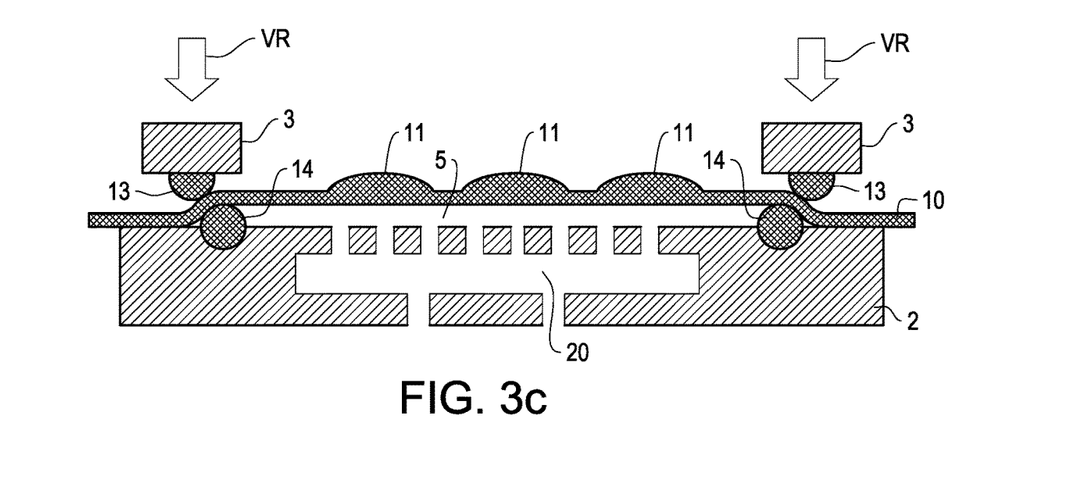
Figure 3D:
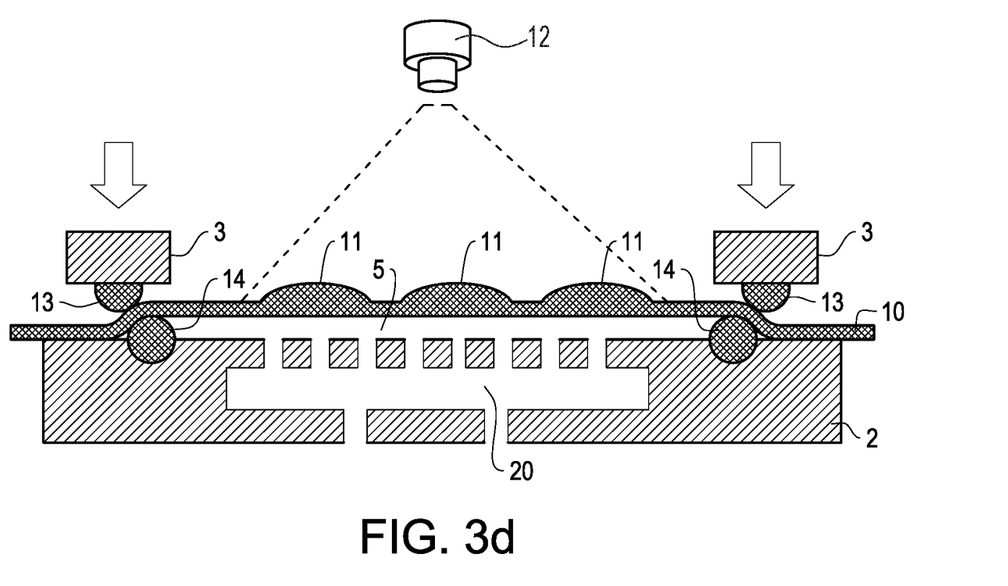
Figure 3E:
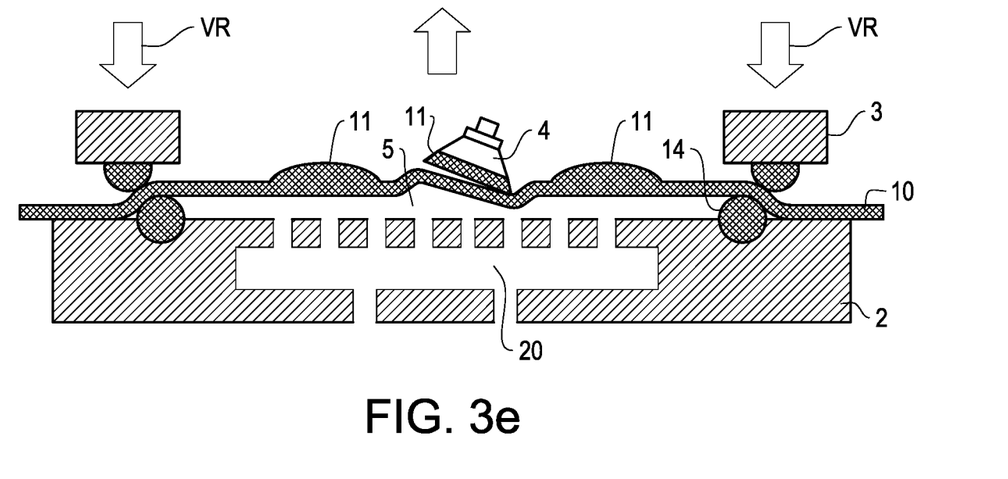

In the FIGS. 3a to 3e a method for the removal of the adhesive element 11 from the support element 10 is represented according to a second exemplary embodiment of the present disclosure. It is herein provided, in a first step, as illustrated in FIG. 3a, for the support element 10 with its adhesive elements 11 to be arranged above the bearing device 2, as seen in a direction extending parallel to the closing direction VR. The support element 10 is in contact, and is preferably exclusively in contact, with the sealing member(s) located at the deposition device side 14. Below the support element 10, a channel system with a plurality of entrance openings 31 and a plurality of exit openings 32 is provided in the deposition device 2, wherein especially the number of the exit openings 32 is larger than the number of the entrance openings 31. In the fixing state, the exit openings 32 are furthermore facing the fixed support element 10 and are evenly distributed on the deposition device 2. In this way, an even air cushion and/or gas cushion below the support element 10 may advantageously be realized.

Following arrangement of the support element 10 above the deposition device 2, it is provided for a fixing device 3, especially in the form of a stretching frame, to be lowered along the closing direction VR, (see FIG. 3b), until the support element 10 becomes clamped between the sealing members located at the stretching frame side 13 and the sealing members located at the deposition device side 14. In the FIG. 3c it may be seen that the sealing member located at the stretching frame side 13 and the sealing member located at the deposition device side 14 are oriented to each other, such that, in the fixed state, a shear force acts on a portion of the support element 10 with the adhesive elements 11. In particular, the support element 10 is deformed, and especially is bent, by a closing force or a compression acting between the sealing members, respectively. In a subsequent process step a sensor unit, especially a camera 12, acquires the position of the adhesive elements 11, so that finally the manipulator 4 may selectively be transferred to one of the adhesive elements 11, for the uptake thereof. By means of a joint stamp, the adhesive element 11 arranged above the air cushion and/or gas cushion is allowed to be released from the support element 10. For this, a negative pressure is provided to the joint stamp, by which the adhesive element 11 may be aspirated. It is preferred for the joint stamp to be guided in a pivoted or inclined manner in relation to the adhesive element 11, while the adhesive element 11 is being removed. In combination with the air cushion below the adhesive element 11, the adhesive element 11 is advantageously to be peeled off from the support element 10, i.e. the adhesive element 11 is successively released in certain areas from the support element 10, until it finally is completely separated from the support element 10. In this way, failure probability for the adhesive element 11 not to become released from the support element 11, is reduced.

According to an alternative embodiment of the FIGS. 3a-3e, the stretching frame and/or clamping frame that is to be lowered from above, serving as part of the fixing device 3, may be omitted, but instead, the sealing members located at the deposition device side 14 may also be mounted in a frame displaceable in the deposition device, and may be displaced to the top towards the support element 10, if the support element 10 was fixed by way of a fixing device 3 at the fringe of the deposition device. There may be clamps, bars, sealing members or other elements that fix the support element 10 at the fringe of the deposition device 2. By telescoping the sealing members located at the deposition direction side 14 the support element 10 becomes stretched. This may be promoted by a negative pressure, which however should not be as high for the support element 10 to be aspirated to contact the deposition device 2.

Figure 4A:
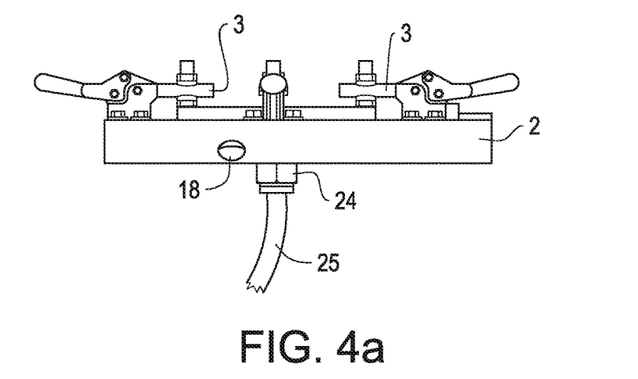
FIG. 4a to 4c: shows a device for the automated removal of an adhesive element from a support element according to a third preferred embodiment of the present disclosure.
Figure 4B:
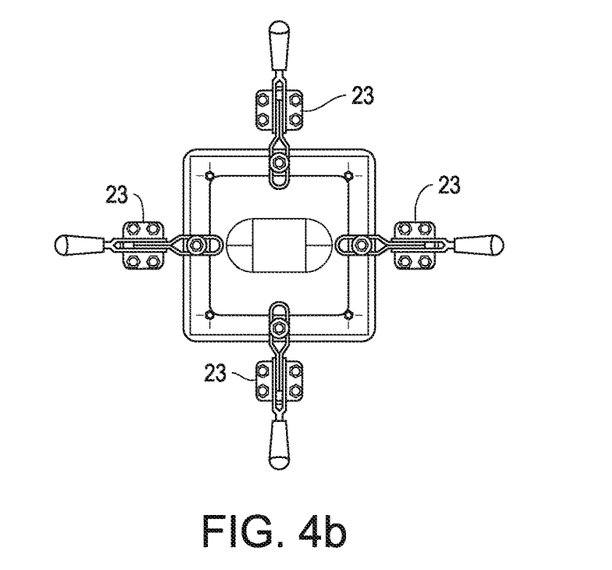
Figure 4C:
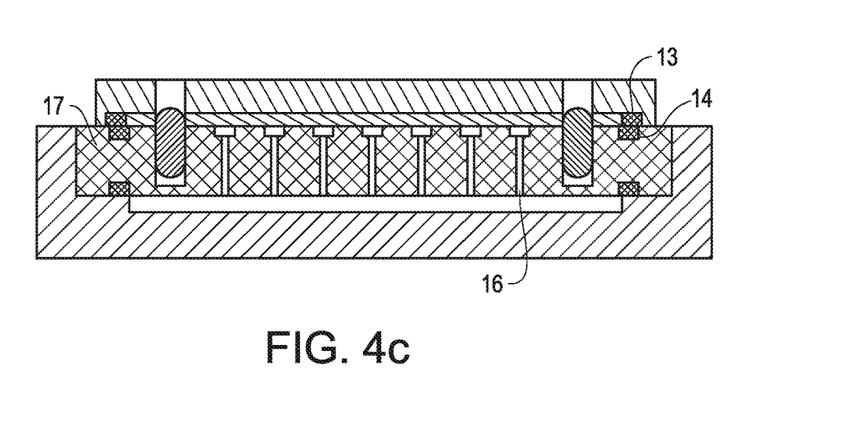

In the FIGS. 4a to 4c a device for the automated removal of an adhesive element 11 from a support element 10 is represented according to a third preferred embodiment of the present disclosure. In addition to the embodiments of the preceding figures, several fixing devices 3 are provided herein, which are able to be transferred into the fixing state by way of a lever mechanism, for example a knee lever mechanism 23 (see sectional view 4a). In particular, the deposition device 2 is formed square-shaped (see top view in FIG. 4b) or rectangular-shaped in a plane as seen perpendicular to the closing direction VR, and is provided with a lever mechanism at each side of the rectangle or the square. Preferably, the respective lever mechanism is provided in the center of each side, so that an even clamping force for the fixing state may be achieved with the fixing device. It is furthermore provided for the deposition device 2 to comprise a connecting device 24, to which a tubing 25 is attachable for the connection of the deposition device-integrated channel to a gas pressure device, for example a pump. It is furthermore preferably provided for the deposition device 2 to comprise a replaceable insert 17 with a channel system, wherein the insert is insertable into a pot-shaped or recessed portion of the deposition device. Preferably, the insert 17 comprises the deposition side sealing member and, on an opposite side, comprises another sealing member 26 for sealing the channel system.

The invention claimed is:

1. A device for an automated removal of one or more adhesive elements from a support element . . . fixed support element is stretched along the main extension plane and is spaced apart from the deposition device.

2. The device according to claim 1, further comprising a gas pressure device configured to produce an overpressure or negative pressure in an area between the deposition device and the support element.

3. The device according to claim 2, wherein the deposition device comprises a channel or a channel system, and the channel or the channel system connects the gas pressure device and the area between the deposition device and the support element to each other.

4. The device according to claim 1, wherein the fixing device comprises a stretching or clamping frame or a pulling device or a stretching device.

5. The device according to claim 1, wherein the fixing device comprises a lever mechanism for pressing the fixing device against the deposition device.

6. The device according to claim 1, further comprising a sensor device for acquiring the position of the one or more adhesive elements on the support element.

7. The device according to claim 1, wherein the deposition device comprises a centering aid to orient at least one of the support element and the fixing device on the deposition device.

8. The device according to claim 1, wherein the deposition device comprises at least one of a relief valve and shaped elements in the area between the deposition device and the support element.

9. A system comprising a manipulator and the device according to claim 1.

10. A method for an automated removal of one or more adhesive elements from a support element via the device according to claim 1, the method comprising: fixing and stretching the support element at the deposition device by way of the fixing device to form a distance between the deposition device and the support element; and removing the one or more adhesive elements from the support element by way of a manipulator.

11. The device according to claim 1, wherein the fixed support element is stretched in an area with the one or more adhesive elements.

12. The device according to claim 5, wherein the lever mechanism is a knee lever mechanism.

13. The device according to claim 6, wherein the sensor device is a camera.

14. The system according to claim 9, wherein the manipulator is configured to peel the one or more adhesive elements from the fixed support element.

* * * * *